United States Patent
Nakashima et al.

(10) Patent No.: US 12,527,686 B2
(45) Date of Patent: Jan. 20, 2026

(54) COOLING SHEET

(71) Applicant: HISAMITSU PHARMACEUTICAL CO., INC., Tosu (JP)

(72) Inventors: Kentaro Nakashima, Tosu (JP); Keiichiro Tsurushima, Tosu (JP); Takaaki Yoshinaga, Tosu (JP)

(73) Assignee: HISAMITSU PHARMACEUTICAL CO., INC., Tosu (JP)

( * ) Notice: Subject to any disclaimer, the term of this patent is extended or adjusted under 35 U.S.C. 154(b) by 933 days.

(21) Appl. No.: 17/430,035

(22) PCT Filed: Feb. 14, 2020

(86) PCT No.: PCT/JP2020/005844
§ 371 (c)(1),
(2) Date: Aug. 11, 2021

(87) PCT Pub. No.: WO2020/170978
PCT Pub. Date: Aug. 27, 2020

(65) Prior Publication Data
US 2022/0125626 A1    Apr. 28, 2022

(30) Foreign Application Priority Data
Feb. 18, 2019 (JP) ................. 2019-026594

(51) Int. Cl.
*A61F 7/02* (2006.01)
*C08K 5/12* (2006.01)
*C09J 129/04* (2006.01)

(52) U.S. Cl.
CPC .............. *A61F 7/02* (2013.01); *C08K 5/12* (2013.01); *C09J 129/04* (2013.01); *A61F 2007/0226* (2013.01)

(58) Field of Classification Search
CPC ............. A61F 7/02; A61F 2007/0226; A61F 2007/0261; C08K 5/12; C09J 129/04
See application file for complete search history.

(56) References Cited

U.S. PATENT DOCUMENTS

| | | | |
|---|---|---|---|
| 11,311,412 B2 * | 4/2022 | Obata | A61F 7/10 |
| 2014/0302118 A1 * | 10/2014 | Kawamura | A61K 31/167 |
| | | | 514/626 |
| 2014/0322300 A1 | 10/2014 | Kijima et al. | |

FOREIGN PATENT DOCUMENTS

| | | |
|---|---|---|
| EP | 4105290 A1 | 12/2022 |
| JP | 06-135828 A | 5/1994 |

(Continued)

OTHER PUBLICATIONS

International Preliminary Report on Patentability (with translation of Written Opinion) dated Aug. 10, 2021, issued by the International Bureau in application No. PCT/JP2020/005844.

(Continued)

*Primary Examiner* — Joanne M Rodden
*Assistant Examiner* — Dana Stumpfoll
(74) *Attorney, Agent, or Firm* — Sughrue Mion, PLLC

(57) ABSTRACT

A cooling sheet comprising: a backing layer; an adhesive agent layer; and a liner layer for protecting the adhesive agent layer, wherein the adhesive agent layer contains
water at 65 to 85% by mass based on a total mass of the adhesive agent layer,
polyalkylene glycol monooleate at 0.12 to 0.7% by mass based on the total mass of the adhesive agent layer,
polyvinyl alcohol at 3 to 10% by mass based on the total mass of the adhesive agent layer,
polyacrylic acid at 0.5 to 5% by mass based on the total mass of the adhesive agent layer, and
a parahydroxybenzoate at 0.01 to 1% by mass based on the total mass of the adhesive agent layer, and (Continued)

a mass ratio of a content of the polyvinyl alcohol to a content of the polyacrylic acid is in a range of 1.2:1 to 5:1.

7 Claims, 1 Drawing Sheet

(56) References Cited

FOREIGN PATENT DOCUMENTS

| | | | |
|---|---|---|---|
| JP | 2003-116908 A | | 4/2003 |
| JP | 2005-95495 A | | 4/2005 |
| JP | 2007-029638 A | | 2/2007 |
| JP | 2007296120 A | * | 11/2007 |
| JP | 2010168364 A | * | 8/2010 |
| JP | 2010-280609 A | | 12/2010 |
| JP | 2010284519 A | * | 12/2010 |
| JP | 2012-210407 A | | 11/2012 |
| TW | 201328730 A1 | | 7/2013 |
| WO | WO-2019131524 A1 | * | 7/2019 ........... A61K 31/192 |
| WO | 2021/161895 A1 | | 8/2021 |

OTHER PUBLICATIONS

Extended European Search Report dated Oct. 13, 2022 from the European Patent Office in EP Application No. 20758435.0.
Notice of Reasons for Refusal dated Feb. 4, 2022 from the Japanese Patent Office in Japanese Application No. 2021-501947.
Communication dated Feb. 8, 2022 from the Taiwanese Patent Office in Taiwanese Application No. 109105120.
Taiwanese Office Action dated Nov. 23, 2022 in Taiwanese Application No. 109105120.
Decision of Refusal dated Jun. 28, 2022 from the Japanese Patent Office in Japanese Application No. 2021-501947.
International Search Report of PCT/JP2020/005844 dated Apr. 21, 2020 [PCT/ISA/210].

* cited by examiner

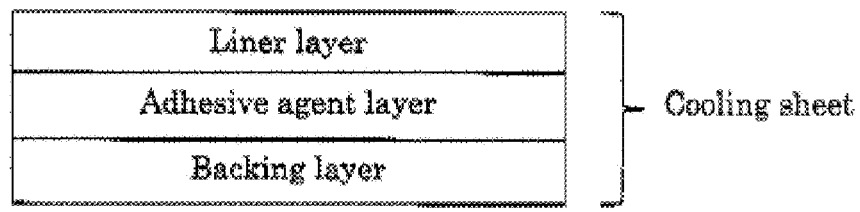

COOLING SHEET

CROSS REFERENCE TO RELATED APPLICATIONS

This application is a National Stage of International Application No. PCT/JP2020/005844, filed Feb. 14, 2020, claiming priority to Japanese Patent Application No. 2019-026594, filed Feb. 18, 2019.

TECHNICAL FIELD

The present invention relates to a cooling sheet, and more particularly to a cooling sheet including a backing layer, an adhesive agent layer, and a liner layer for protecting the adhesive agent layer.

BACKGROUND ART

Conventionally, cooling sheets for comfortably cooling an applied site such as a human body or clothing have been known, and as such cooling sheets, various cooling sheets have been developed to enhance cooling performance such as cooling power and cooling duration. For example, Japanese Patent Application Publication No. 2010-284519 (PTL 1) discloses a cooling sheet which includes a permeable skin-side support, an intermediate base material, and a clothing-side support, wherein the intermediate base material contains water, a polymer compound, and a volatile substance, and the clothing-side support has at least an adhesive agent layer and a moisture permeation prevention layer. In addition, Japanese Patent Application Publication No. 2007-29638 (PTL 2) discloses a cooling sheet which includes a water-insoluble adhesive agent layer provided on one side of a water-absorbent sheet, wherein a surface of the water-absorbent sheet on the opposite side of the adhesive agent layer is adsorbed by a water-containing gel body with high water content and low adhesiveness.

However, the cooling sheets of the type described in PTLs 1 and 2 are both used with the water-containing layer (intermediate base material in PTL 1, and water-containing gel body in PTL 2) in contact with the applied site with the adhesiveness layer (in PTL 1, the skin-side support having a moisture permeation prevention layer, and in PTL 2, the water-insoluble adhesive agent layer) in between, and are not necessarily sufficient in terms of cooling performance.

On the other hand, there have been known cataplasms obtained by blending water-soluble polymers, water, and the like in the adhesive agent layer that directly contacts the applied site. For example, Japanese Patent Application Publication No. Hei 6-135828 (PTL 3) discloses a transdermal absorption formulation, the transdermal absorption formulation containing a water-soluble polymer, a polyhydric alcohol, water, and a drug, wherein the water-soluble polymer is a solid or powdered polyacrylic acid with a 10% aqueous solution viscosity of 100 to 1000 cps.

CITATION LIST

Patent Literature

[PTL 1] Japanese Patent Application Publication 2010-284519
[PTL 2] Japanese Patent Application Publication 2007-29638
[PTL 3] Japanese Patent Application Publication Hei 6-135828

SUMMARY OF INVENTION

Technical Problem

In conventional cataplasms that contain water-soluble polymers, water, and the like in the adhesive agent layer that directly contacts the applied site, the water content is generally 20 to 60% by mass, and the mass of the adhesive agent layer is generally about 200 to 1000 g/m². With this in mind, the present inventors first examined the possibility of increasing the water content and the mass of the adhesive agent layer in order to enhance the cooling performance, such as cooling power and cooling duration, and to strengthen the function of the cooling sheet. As a result, the present inventors found that problems occurred such as so-called "liner displacement" where the liner shifts from the adhesive agent layer during storage, so-called "seepage" where part of the adhesive agent layer seeps into the backing layer during storage and use, insufficient adhesion strength, and the possibility of bacteria and mold growth in the adhesive agent layer during long-term storage.

The present invention has been made in consideration of the above issues found by the present inventors, and aims to provide a cooling sheet of the type which contains a water-soluble polymer, water, and the like in an adhesive agent layer that directly contacts an applied site, wherein even when the water content is increased and the mass of the adhesive agent layer is increased, the occurrence of liner displacement and seepage is sufficiently suppressed, the adhesion strength is sufficiently high, and the growth of bacteria and mold in the adhesive agent layer is sufficiently prevented over a long period of time.

Solution to Problem

The present inventors have made earnest studies to achieve the above object, and have found as a result that first, although parahydroxybenzoates are effective as an antiseptic to prevent the growth of bacteria and mold in the adhesive agent layer, as the water content increases, the parahydroxybenzoate, which is sparingly soluble in water, becomes harder to dissolve even when a surfactant is blended, and part of it remains as a solid content without dissolving, which is the reason why bacterial and mold growth is not sufficiently prevented. Then, the present inventors investigated surfactants effective in dissolving parahydroxybenzoates, and have found that when a predetermined amount of polyalkylene glycol monooleate is used as a surfactant, it becomes possible to completely dissolve a parahydroxybenzoate in an adhesive agent layer with high water content even when the water content is increased to 65% by mass or more, and the growth of bacteria and mold in the adhesive agent layer is sufficiently prevented over a long period of time.

In addition, the present inventors have found that when a predetermined amount of polyalkylene glycol monooleate is used as a surfactant, as well as a predetermined amount of polyvinyl alcohol and a predetermined amount of polyacrylic acid are blended in combination as water-soluble polymers, even when the water content is increased to 65% by mass or more to enhance cooling performance such as cooling power and cooling duration, and the mass of the adhesive agent layer is increased to 1500 g/m² or more, it is possible to obtain a cooling sheet with sufficiently high adhesion strength (adherence) while sufficiently suppressing the occurrence of liner displacement and seepage. Thus, the present invention has been completed.

A cooling sheet of the present invention is a cooling sheet comprising: a backing layer; an adhesive agent layer; and a liner layer for protecting the adhesive agent layer, wherein the adhesive agent layer contains water at 65 to 85% by mass based on a total mass of the adhesive agent layer,
polyalkylene glycol monooleate as a surfactant at 0.12 to 0.7% by mass based on the total mass of the adhesive agent layer,
polyvinyl alcohol as a first water-soluble polymer at 3 to 10% by mass based on the total mass of the adhesive agent layer,
polyacrylic acid as a second water-soluble polymer at 0.5 to 5% by mass based on the total mass of the adhesive agent layer, and
a parahydroxybenzoate as an antiseptic at 0.01 to 1% by mass based on the total mass of the adhesive agent layer, and
a mass ratio of a content of the polyvinyl alcohol to a content of the polyacrylic acid (content of the polyvinyl alcohol:content of the polyacrylic acid) is in a range of 1.2:1 to 5:1.

In the cooling sheet of the present invention, it is preferable that the adhesive agent layer further contains a neutralized polyacrylic acid as a third water-soluble polymer at 1 to 10% by mass based on the total mass of the adhesive agent layer.

In addition, in the cooling sheet of the present invention, it is preferable that in the adhesive agent layer, the mass ratio of the content of polyalkylene glycol monooleate to the content of parahydroxybenzoate (content of polyalkylene glycol monooleate:content of parahydroxybenzoate) is 1.2:1 to 7:1.

Further, in the cooling sheet of the present invention, the mass of the adhesive agent layer is preferably 1500 to 2300 g/m².

Advantageous Effects of Invention

The present invention makes it possible to provide a cooling sheet of the type which contains a water-soluble polymer, water, and the like in an adhesive agent layer that directly contacts an applied site, wherein even when the water content is increased and the mass of the adhesive agent layer is increased, the occurrence of liner displacement and seepage is sufficiently suppressed, the adhesion strength is sufficiently high, and the antiseptic is completely dissolved, so that the growth of bacteria and mold in the adhesive agent layer is sufficiently prevented over a long period of time.

BRIEF DESCRIPTION OF THE DRAWINGS

FIG. 1 is a schematic view showing an example of the cooling sheet including a backing layer, an adhesive agent layer, and a liner layer for protecting the adhesive agent layer.

DESCRIPTION OF EMBODIMENTS

Hereinafter, the present invention is described in detail according to the preferred embodiments thereof. A cooling sheet of the present invention is a cooling sheet including a backing layer, an adhesive agent layer, and a liner layer for protecting the adhesive agent layer. Further, the adhesive agent layer in the cooling sheet of the present invention contains water at 65 to 85% by mass based on a total mass of the adhesive agent layer,
polyalkylene glycol monooleate as a surfactant at 0.12 to 0.7% by mass based on the total mass of the adhesive agent layer,
polyvinyl alcohol as a first water-soluble polymer at 3 to 10% by mass based on the total mass of the adhesive agent layer,
polyacrylic acid as a second water-soluble polymer at 0.5 to 5% by mass based on the total mass of the adhesive agent layer, and
a parahydroxybenzoate as an antiseptic at 0.01 to 1% by mass based on the total mass of the adhesive agent layer, and
a mass ratio of a content of the polyvinyl alcohol to a content of the polyacrylic acid (content of the polyvinyl alcohol:content of the polyacrylic acid) is in a range of 1.2:1 to 5:1.

The water contained in the adhesive agent layer according to the present invention is not particularly limited, but is preferably water subjected to purification such as ion exchange, distillation, and filtration. For example, the "purified water" described in the Japanese Pharmacopoeia (17th revised Japanese Pharmacopoeia) can be preferably used.

The content of water in the adhesive agent layer according to the present invention needs to be 65 to 85% by mass based on the total mass of the adhesive agent layer. When the water content is less than the lower limit, sufficiently excellent cooling power and cooling duration cannot be obtained, and the cooling performance becomes insufficient. Meanwhile, when the water content is more than the upper limit, liner displacement and seepage are likely to occur, and the adhesion strength (adherence) becomes insufficient. Also, from the same viewpoint, the water content is more preferably 70 to 80% by mass based on the total mass of the adhesive agent layer.

The adhesive agent layer according to the present invention needs to contain a parahydroxybenzoate (a parahydroxybenzoic acid ester) as an antiseptic. Parahydroxybenzoates are a sparingly soluble crystalline compound that is poorly soluble in water, although they are extremely excellent as an antiseptic for preventing the growth of bacteria and mold in the adhesive agent layer for a long period of time. Examples of such parahydroxybenzoates include methyl parahydroxybenzoate (methylparaben), ethyl parahydroxybenzoate (ethylparaben), propyl parahydroxybenzoate (propylparaben), isopropyl parahydroxybenzoate (isopropylparaben), butyl parahydroxybenzoate (butylparaben), and isobutyl parahydroxybenzoate (isobutylparaben). Above all, from the viewpoint of high solubility in surfactants, methyl parahydroxybenzoate, ethyl parahydroxybenzoate, and propyl parahydroxybenzoate are preferable, a mixture of methyl parahydroxybenzoate and propyl parahydroxybenzoate is more preferable, and a mixture having a mass ratio of methyl parahydroxybenzoate to propyl parahydroxybenzoate (content of methyl parahydroxybenzoate:content of propyl parahydroxybenzoate) of 3:1 to 1:3 is particularly preferable.

The content of the parahydroxybenzoate in the adhesive agent layer according to the present invention needs to be 0.01 to 1% by mass based on the total mass of the adhesive agent layer. When the content of the parahydroxybenzoate is less than the lower limit, the growth of bacteria and mold in the adhesive agent layer is not sufficiently prevented. Meanwhile, when the content of the parahydroxybenzoate is more than the upper limit, part of it is not dissolved and remains as a solid content in the adhesive agent layer to reduce the uniformity of the adhesive agent layer, resulting in a cooling sheet having an impaired appearance. In addition, from the same viewpoint, the content of the parahydroxybenzoate is more preferably 0.05 to 0.5% by mass, and more preferably 0.05 to 0.3% by mass, based on the total mass of the adhesive agent layer.

In the adhesive agent layer according to the present invention, it is necessary that polyalkylene glycol monooleate is blended as a surfactant. When a predetermined amount of polyalkylene glycol monooleate is used as a surfactant, it becomes possible to completely dissolve a parahydroxybenzoate in an adhesive agent layer with high water content even when the water content is increased to 65% by mass or more, and the growth of bacteria and mold in the adhesive agent layer is sufficiently prevented over a long period of time. At the same time, when blended with a water-soluble polymer described later, even when the mass of the adhesive agent layer is increased to 1500 g/m² or more, it is possible to obtain a cooling sheet with sufficiently high adhesion strength while sufficiently suppressing the occurrence of liner displacement and seepage. Such effects cannot be obtained with surfactants other than polyalkylene glycol monooleate. For example, even with polyethylene glycol monostearate having a relatively similar structure, it is difficult to completely dissolve the parahydroxybenzoate in the adhesive agent layer having high water content. Further, even with polyoxyethylene sorbitan monooleate, it is difficult to obtain a cooling sheet having sufficiently high adhesion strength while sufficiently suppressing the occurrence of liner displacement and seepage. Examples of such polyalkylene glycol monooleate include polyethylene glycol monooleate, polypropylene glycol monooleate, and polyethylene polypropylene glycol monooleate, and among these, polyethylene glycol monooleate is preferable from the viewpoint of being able to dissolve the parahydroxybenzoate more efficiently.

The content of polyalkylene glycol monooleate in the adhesive agent layer according to the present invention needs to be 0.12 to 0.7% by mass based on the total mass of the adhesive agent layer. When the content of the polyalkylene glycol monooleate is less than the lower limit, it becomes difficult to completely dissolve the parahydroxybenzoate in the adhesive agent layer with high water content, and the growth of bacteria and mold in the adhesive agent layer is not sufficiently prevented. Meanwhile, when the content of the polyalkylene glycol monooleate is more than the upper limit, the moldability and shape retention of the adhesive agent layer deteriorate, and the occurrence of liner displacement and seepage is not sufficiently suppressed. In addition, from the same viewpoint, the content of the polyalkylene glycol monooleate is more preferably 0.15 to 0.5% by mass, and particularly preferably 0.2 to 0.4% by mass, based on the total mass of the adhesive agent layer.

Further, in the adhesive agent layer according to the present invention, the mass ratio of the content of polyalkylene glycol monooleate to the content of parahydroxybenzoate (content of polyalkylene glycol monooleate:content of parahydroxybenzoate) is preferably 1.2:1 to 7:1, and more preferably 1.5:1 to 5:1. When the ratio of the content of the polyalkylene glycol monooleate to the content of the parahydroxybenzoate is less than the lower limit, it becomes difficult to completely dissolve the parahydroxybenzoate in an adhesive agent layer with high water content, and it tends to be difficult to sufficiently prevent the growth of bacteria and mold in the adhesive agent layer. Meanwhile, when the ratio is more than the upper limit, the moldability and shape retention of the adhesive agent layer deteriorate, and the occurrence of liner displacement and seepage tends to be insufficiently suppressed.

In the adhesive agent layer according to the present invention, the water-soluble polymer needs to be a combination of polyvinyl alcohol (first water-soluble polymer) and polyacrylic acid (second water-soluble polymer). When the aforementioned predetermined amount of polyalkylene glycol monooleate is used as a surfactant, as well as a predetermined amount of polyvinyl alcohol and a predetermined amount of polyacrylic acid are blended in combination as water-soluble polymers, even when the water content is increased to 65% by mass or more to enhance cooling performance such as cooling power and cooling duration, and the mass of the adhesive agent layer is increased to 1500 g/m² or more, it is possible to obtain a cooling sheet with sufficiently high adhesion strength while sufficiently suppressing the occurrence of liner displacement and seepage.

The content of polyvinyl alcohol in the adhesive agent layer according to the present invention needs to be 3 to 10% by mass based on the total mass of the adhesive agent layer. When the content of the polyvinyl alcohol is less than the lower limit, the moldability and shape retention of the adhesive agent layer deteriorate, and the occurrence of liner displacement and seepage is not sufficiently suppressed. Meanwhile, when the content of the polyvinyl alcohol is more than the upper limit, the hardness of the adhesive agent layer becomes high and thus sufficient adhesion strength cannot be obtained, and unevenness is likely to occur when the adhesive agent composition is spread. In addition, from the same viewpoint, the content of the polyvinyl alcohol is more preferably 4 to 6% by mass based on the total mass of the adhesive agent layer.

Further, the content of polyacrylic acid in the adhesive agent layer according to the present invention needs to be 0.5 to 5% by mass based on the total mass of the adhesive agent layer. When the content of the polyacrylic acid is less than the lower limit, the hardness of the adhesive agent layer becomes high and thus sufficient adhesion strength cannot be obtained, and liner displacement is likely to occur, and unevenness is likely to occur when the adhesive agent composition is spread. Meanwhile, when the content of the polyacrylic acid exceeds the upper limit, moldability and shape retention of the adhesive agent layer deteriorate, and the occurrence of liner displacement and seepage is not sufficiently suppressed. In addition, from the same viewpoint, the content of the polyacrylic acid is more preferably 1 to 3% by mass based on respect to the total mass of the adhesive agent layer.

Further, in the adhesive agent layer according to the present invention, the mass ratio of the content of the polyvinyl alcohol to the content of the polyacrylic acid (content of the polyvinyl alcohol:content of the polyacrylic acid) needs to be 1.2:1 to 5:1. When the ratio of the content of the polyvinyl alcohol to the content of the polyacrylic acid is less than the lower limit, the moldability and shape retention of the adhesive agent layer deteriorate, and the occurrence of liner displacement and seepage is not sufficiently suppressed. Meanwhile, when the ratio is more than the upper limit, the hardness of the adhesive agent layer becomes high and thus sufficient adhesion strength cannot be obtained, and liner displacement is likely to occur, and unevenness is likely to occur when the adhesive agent composition is spread. In addition, from the same viewpoint, the mass ratio of the content of the polyvinyl alcohol to the content of the polyacrylic acid (content of the polyvinyl alcohol:content of the polyacrylic acid) is more preferably 1.3:1 to 4:1, and particularly preferably 1.5:1 to 3:1.

In the adhesive agent layer according to the present invention, it is preferable that a neutralized polyacrylic acid (third water-soluble polymer) is further blended as a water-soluble polymer. When a neutralized polyacrylic acid is further blended as a water-soluble polymer, the moldability and shape retention of the adhesive agent layer tend to be higher. Even when another water-soluble polymer is used instead of the neutralized polyacrylic acid as the third water-soluble polymer, improvement in moldability and shape retention cannot be obtained. For example, when gelatin is used as the third water-soluble polymer, seepage is likely to occur. Meanwhile, when xanthan gum is used as the third water-soluble polymer, the hardness of the adhesive agent layer becomes high and thus sufficient adhesion strength cannot be obtained, and liner displacement is likely to occur, and unevenness is likely to occur when the adhesive agent composition is spread.

Such a neutralized polyacrylic acid is obtained by neutralizing all or some of the carboxyl groups of the polyacrylic acid with an alkali metal such as sodium or potassium, ammonium ions, or the like, and examples thereof include sodium polyacrylate, potassium polyacrylate, and ammonium polyacrylate, and among these, sodium polyacrylate is preferable from the viewpoint that the moldability and shape retention of the adhesive agent layer tend to be further improved. In addition, the neutralization rate of the neutralized polyacrylic acid is not particularly limited, but is preferably 30 to 100%. When the neutralized polyacrylic acid is further blended in the adhesive agent layer according to the present invention, the content thereof is preferably 1 to 10% by mass, and more preferably 3 to 6% by mass, based on the total mass of the adhesive agent layer. When the content of the neutralized polyacrylic acid is less than the lower limit, the moldability and shape retention of the adhesive agent layer are reduced, which tends to cause seepage to occur easily. Meanwhile, when the content of the neutralized polyacrylic acid is more than the upper limit, the hardness of the adhesive agent layer becomes high, so that it becomes difficult to obtain sufficient adhesion strength, and unevenness tends to occur when the adhesive agent composition is spread.

In addition, when the neutralized polyacrylic acid is further blended in the adhesive agent layer according to the present invention, the total content of the polyacrylic acid and the neutralized polyacrylic acid is preferably 1.5 to 15% by mass, more preferably 3 to 12% by mass, and particularly preferably 4 to 10% by mass, based on the total mass of the adhesive agent layer. When the total content of the polyacrylic acid and the neutralized polyacrylic acid is less than the lower limit, the moldability and shape retention of the adhesive agent layer are reduced, which tends to cause seepage to occur easily. Meanwhile, when the total content of the polyacrylic acid and the neutralized polyacrylic acid is more than the upper limit, the hardness of the adhesive agent layer becomes high, so that it becomes difficult to obtain sufficient adhesion strength, and unevenness tends to occur when the adhesive agent composition is spread. Further, when the neutralized polyacrylic acid is further blended in the adhesive agent layer according to the present invention, the mass ratio of the content of the neutralized polyacrylic acid to the content of the polyacrylic acid (content of the neutralized polyacrylic acid:content of the polyacrylic acid) is preferably 1:1 to 5.5:1, and particularly preferably 1.5:1 to 5:1. When the ratio of the content of the neutralized polyacrylic acid to the content of the polyacrylic acid is less than the lower limit, the moldability and shape retention of the adhesive agent layer are reduced, which tends to cause seepage to occur easily. Meanwhile, when the ratio is more than the upper limit, the hardness of the adhesive agent layer becomes high, so that it becomes difficult to obtain sufficient adhesion strength, and unevenness tends to occur when the adhesive agent composition is spread.

In addition, when the neutralized polyacrylic acid is further blended in the adhesive agent layer according to the present invention, the mass ratio of the content of the polyvinyl alcohol to the total content of the polyacrylic acid and the neutralized polyacrylic acid (content of the polyvinyl alcohol:total content of the polyacrylic acid and the neutralized polyacrylic acid) is preferably 0.33:1 to 1:1, and particularly preferably 0.4:1 to 0.9:1. When the ratio of the content of the polyvinyl alcohol to the total content of the polyacrylic acid and the neutralized polyacrylic acid is less than the lower limit, the hardness of the adhesive agent layer becomes high, so that it becomes difficult to obtain sufficient adhesion strength, and unevenness tends to occur when the adhesive agent composition is spread. Meanwhile, when the ratio is more than the upper limit, the moldability and shape retention of the adhesive agent layer are reduced, which tends to cause seepage to occur easily.

Further, in the cooling sheet of the present invention, the adhesive agent layer may further contain another water-soluble polymer different from the first to third water-soluble polymers, and examples of such other water-soluble polymers include gelatin, polyvinylpyrrolidone, sodium alginate, hydroxypropyl cellulose, sodium carboxymethyl cellulose (sodium carmellose), methyl cellulose, carrageenan, glucomannan, agar, guar gum, xanthan gum, gellan gum, pectin, and locust bean gum. When such another water-soluble polymer is further blended in the adhesive agent layer according to the present invention, the content thereof is preferably 5% by mass or less based on the total mass of the adhesive agent layer.

Further, in the cooling sheet of the present invention, in addition to the above components, the adhesive agent layer may further be blended with components commonly used in cooling sheets, such as refreshing agents, wetting agents (humectants), and fillers (excipients).

The refreshing agent is for improving cooling performance such as cooling power and cooling duration when a cooling sheet is used, and may have an aroma. Examples of the refreshing agents include thymol, l-menthol, dl-menthol, l-isopulegol, and mint oil. When the refreshing agent is further blended, the content thereof is preferably 0.01 to 1% by mass, more preferably 0.03 to 0.5% by mass, based on the total mass of the adhesive agent layer. When the content of the refreshing agent is less than the lower limit, it tends to be difficult to obtain a sufficient refreshing sensation. Meanwhile, when the content of the refreshing agent is more than the upper limit, the refreshing sensation tends to be too strong.

Examples of the wetting agents (humectants) include polyhydric alcohols such as glycerin, propylene glycol, 1,3-butylene glycol, and sorbitol. When the wetting agent is further blended, the content thereof is preferably 10 to 60% by mass based on the total mass of the adhesive agent layer. When the content of the wetting agent is less than the lower limit, it tends to be difficult to obtain a sufficient moisturizing effect. Meanwhile, when the content of the wetting agent is more than the upper limit, the solubility of the water-soluble polymer tends to decrease.

Examples of the fillers (excipients) include inorganic substances such as kaolin, zinc oxide, titanium oxide, talc, bentonite, hydrous aluminum silicate, and magnesium aluminometasilicate. When the filler is further blended, the content thereof is preferably 6% by mass or less based on the total mass of the adhesive agent layer. When the content of the filler exceeds the upper limit, the adhesion strength of the adhesive agent layer tends to decrease.

In the cooling sheet of the present invention, the mass of the adhesive agent layer (mass per unit area (area of the application surface)) is not particularly limited, but is preferably 500 g/m$^2$ or more, more preferably 750 g/m$^2$ or more, further preferably 1000 g/m$^2$ or more, and particularly preferably 1500 g/m$^2$ or more, because in the cooling sheet of the present invention, even when the water content in the adhesive agent layer is increased and the mass of the adhesive agent layer is further increased, the occurrence of liner displacement and seepage is sufficiently suppressed, the adhesion strength is sufficiently high, and the growth of bacteria and mold in the adhesive agent layer is sufficiently prevented over a long period of time. When the mass of the adhesive agent layer is less than the lower limit, it tends to be difficult to obtain sufficient cooling performance such as cooling power and cooling duration. Meanwhile, the upper limit of the mass of the adhesive agent layer is preferably 2300 g/m$^2$. When the mass of the adhesive agent layer exceeds 2300 g/m$^2$, even the cooling sheet of the present invention tends to cause liner displacement.

The cooling sheet of the present invention includes a backing layer that supports the adhesive agent layer and a liner layer that protects the adhesive agent layer.

The backing layer may be any one that can support the adhesive agent layer, and is not particularly limited, but it is possible to appropriately employ a known backing layer for the cooling sheet. Examples of the material of the backing layer according to the present invention include polyolefins such as polyethylene and polypropylene; ethylene-vinyl acetate copolymers, vinyl acetate-vinyl chloride copolymers, polyvinyl chloride, and the like; polyamides such as nylon; polyesters such as polyethylene terephthalate (PET), polybutylene terephthalate, and polyethylene naphthalate; cellulose derivatives; synthetic resins such as polyurethane, and metals such as aluminum. Examples of the form of the backing layer include films; sheet-shaped products such as sheets, sheet-shaped porous bodies, and sheet-shaped foams; fabrics such as woven fabrics, knitted fabrics, and nonwoven fabrics; foils; and laminates thereof. In addition, the thickness of the backing layer is not particularly limited, but is preferably in the range of 5 to 1000 μm from the viewpoint of workability and ease of production when the cooling sheet is applied.

The liner layer may be any one that can protect the adhesive agent layer, and is not particularly limited, but it is possible to appropriately employ a known liner layer (release liner) for the cooling sheet. Examples of the material of the liner layer according to the present invention include polyolefins such as polyethylene and polypropylene; ethylene-vinyl acetate copolymers, vinyl acetate-vinyl chloride copolymers, polyvinyl chloride, and the like; polyamides such as nylon; polyesters such as polyethylene terephthalate; cellulose derivatives; synthetic resins such as polyurethane, films and sheets made of materials such as aluminum and paper, and laminates thereof. Preferably, such a liner layer is subjected to a release treatment, such as a silicone-containing compound coating or fluorine-containing compound coating, applied to the side surface in contact with the adhesive agent layer so that it can be easily released from the adhesive agent layer.

Next, the method for producing the cooling sheet of the present invention is described. The method for producing the cooling sheet of the present invention is not particularly limited, but for example, the cooling sheet of the present invention can be preferably obtained by the following method.

Specifically, first, (A) a parahydroxybenzoate, polyalkylene glycol monooleate, and other components sparingly soluble in water (such as l-menthol) are mixed under heated conditions as necessary to obtain a homogeneous mixture. Separately, (B) water-soluble polymers and other water-soluble components (such as glycerin) are added to water and mixed under heated conditions as necessary to obtain a uniform kneaded product. Next, (A) is added to (B) and mixed until uniform to obtain an adhesive agent composition to be formed into the adhesive agent layer according to the present invention. Then, the obtained adhesive agent composition is spread on the surface of the backing layer so as to have a mass per desired unit area to form the adhesive agent layer, and then the liner layer is attached to the surface of the adhesive agent layer opposite to the backing layer, and if necessary, cut into a desired shape to obtain the cooling sheet of the present invention. Alternatively, the adhesive agent composition is first spread on one surface of the liner layer so as to have a mass per unit area to form the adhesive agent layer, and then the backing layer is attached to the surface of the adhesive agent layer opposite to the liner layer, and if necessary, cut into a desired shape to obtain the cooling sheet of the present invention. Further, the obtained cooling sheet may be sealed in a storage packaging container (such as an aluminum packaging bag) as a package, if necessary.

EXAMPLES

Hereinafter, the present invention is described in more detail based on Examples and Comparative Examples, but the present invention is not limited to the following Examples. The various tests in Examples and Comparative Examples were carried out by the methods shown below.

(1) Confirmation Test of Solubility of Parahydroxybenzoate and its Antiseptic Property The parahydroxybenzoates, the surfactant, and l-menthol were weighed so as to have the component ratios in each Example and each Comparative Example (for example, in Example 1, methyl parahydroxybenzoate: 1.0 g, propyl parahydroxybenzoate: 1.0 g, polyethylene glycol monooleate: 6.0 g, l-menthol: 1.6 g), which were mixed in a beaker immersed in a water bath at 60° C., and the solubility of the parahydroxybenzoates in the obtained mixture was evaluated according to the following evaluation scores, and a score of 0 was judged to be acceptable.

Evaluation Score

0: The parahydroxybenzoates are completely dissolved.
1: Part of the parahydroxybenzoates is not dissolved and solid content remains.

Next, water (for example, in Example 1, water: 1448 g) was added to the mixture in an amount that would be a component ratio in each Example and each Comparative Example, and the mixture was mixed until uniform. The solubility of the parahydroxybenzoates in the obtained mixture and the resulting antiseptic property were evaluated according to the following evaluation scores, and a score of 0 was judged to be acceptable.

Evaluation Score

0: The parahydroxybenzoates are completely dissolved, and even when used as an adhesive agent layer containing other components, the growth of bacteria and mold is sufficiently prevented over a long period of time.
1: Part of the parahydroxybenzoates is not dissolved and the solid content remains, and when used as the adhesive agent layer containing other components, the growth of bacteria and mold is not sufficiently prevented.

(2) Confirmation Test of Liner Displacement

The cooling sheets obtained in each Example and each Comparative Example were sealed in an aluminum packaging bag and allowed to stand at room temperature for 24 hours or more. Then, the packaging bag was opened, the deviation between the adhesive agent layer and the liner layer was measured by the following procedure, and the evaluation was made according to the following evaluation scores. Then, the same evaluation was performed on each of the three cooling sheets in each of the Examples and the Comparative Examples, the average value of the scores was used as the evaluation result, and a score (average value) of 1 or less was judged to be acceptable.

Measurement Procedure (i) With the liner layer on the upper surface, the liner layer is released until it is about 3 cm from one end of the cooling sheet, and then the released liner layer is cut off.
(ii) At the top of the slope of 30 degrees, the part where the liner layer has been removed is clipped and one end of the cooling sheet is fixed.
(iii) A weight of 1 kg is connected to the liner layer at the other end of the cooling sheet, and the weight is allowed to stand in that state for 1 minute.
(iv) Then, the magnitude of the deviation between the liner layer and the adhesive agent layer caused by the weight of 1 kg is measured.

Evaluation Score

0: No liner displacement (deviation of less than 0.5 mm)
1: Almost no liner displacement (deviation of 0.5 mm or more and less than 1.5 mm)
2: There is a clear liner displacement (deviation of 1.5 mm or more)
3; Not measurable (liner layer fell off during test).

(3) Confirmation Test of Seepage of Adhesive Agent Layer

The cooling sheets obtained in each example and each Comparative Example were sealed in an aluminum packaging bag and allowed to stand at room temperature for 24 hours or more. Then, the packaging bag was opened, the area of the portion where the adhesive agent layer seeped into the backing layer was measured, and the evaluation was made according to the following evaluation scores. Then, the same evaluation was performed on each of the three cooling sheets in each of the Examples and the Comparative Examples, the average value of the scores was used as the evaluation result, and a score (average value) of 0 was judged to be acceptable.

Evaluation Score

0: No seepage
1: There is a little seepage (area: less than 10%)
2: A slight seepage (area: 10% or more and less than 20%)
3: There is an amount of seepage (area: 20% or more and less than 30%)
4: There is a considerable amount of seepage (area: 30% or more).

(4) Confirmation Test of Adhesion Strength (Adherence) (Rolling Ball Tack Test)

The cooling sheets obtained in each Example and each Comparative Example were sealed in an aluminum packaging bag and allowed to stand at room temperature for 24 hours or more. Then, the packaging bag was opened, and the adhesion strength (adherence) of the adhesive agent layer was evaluated by the following procedure according to the following evaluation scores. Then, the same evaluation was performed on each of the three cooling sheets in each of the Examples and the Comparative Examples, the average value of the scores was used as the evaluation result, and a score (average value) of 1 or less was judged to be acceptable.

Measurement Procedure

A cooling sheet with its liner layer removed was placed on the horizontal bottom of a sine-curved inclined table (height of inclined surface: 17.3 cm, length: 30 cm, gradient: 58%) so that the adhesive agent layer was on the upper surface. A No. 20 steel ball (diameter $20/32$ inches) was allowed to roll from a position at a height of 17.3 cm on the inclined surface of the inclined table, and the distance until the ball (steel ball) stopped on the adhesive agent layer was measured.

Evaluation Score

0: Very good (stop distance: less than 25 mm)
1: Good (stop distance: 25 mm or more and less than 30 mm)
2: Slightly bad (stop distance: 30 mm or more and less than 40 mm)
3: Bad (stop distance: 40 mm or more and less than 50 mm)
4: Very bad (stop distance: 50 mm or more).

(5) Confirmation Test of Uneven Spread

In each Example and each Comparative Example, the unevenness (uneven spread) when the obtained adhesive agent composition was spread on the surface of the liner layer to form the adhesive agent layer was evaluated according to the following evaluation scores. The same evaluation was performed on each of the three cooling sheets, the average value of the scores was used as the evaluation result, and a score (average value) of 0 was judged to be acceptable.

Evaluation Score

0: The surface and thickness are uniform on the entire surface (area: 95% or more) of the adhesive agent layer, and there is no uneven spread
1: The surface and/or thickness of part of the adhesive agent layer (area: more than 5% and less than 50%) is not uniform, and uneven spreading is confirmed.
2: The surface and/or thickness is not uniform on most or the entire surface (area: 50% or more) of the adhesive agent layer, and uneven spreading is confirmed.

(6) Confirmation Test of Cooling Performance

The cooling sheets obtained in each Example and each Comparative Example were sealed in an aluminum packaging bag and allowed to stand at room temperature for 24 hours or more. Then, the packaging bag was opened, the cooling duration of the cooling sheet was measured by the following procedure, and the evaluation was made according to the following evaluation scores, and a score of 1 or less was judged to be acceptable.

Measurement Procedure (i) Water is put in a constant temperature bath, and the water temperature is set to 34° C.
(ii) The temperature sensor of a data logger is fixed to the outer surface of the constant temperature bath with adhesive tape. At this time, make sure the adhesive tape won't touch the temperature sensor.
(iii) Recording of the temperature of the data logger is started. Data acquisition is performed every 5 minutes.
(iv) The liner layer of the cooling sheet is released, the surface of the cooling sheet on the adhesive agent layer side is attached onto the temperature sensor, and the temperature sensor is covered with the cooling sheet.
(v) After covering the temperature sensor with the cooling sheet, the temperature recording is continued for 12 hours or more.
(vi) Starting from the time when the temperature starts to decrease, the time until the decreased temperature starts to increase again is defined as the cooling duration and measured.

Evaluation Score

0: Very good (cooling duration: 5 hours or more)
1: Good (cooling duration: 3 hours or more and less than 5 hours)
2: Slightly bad (cooling duration: 1 hour or more and less than 3 hours)
3: Bad (cooling duration: less than 1 hour).

Example 1

First, (A) a parahydroxybenzoate (a mixture of methyl parahydroxybenzoate and propyl parahydroxybenzoate in a mass ratio of 1:1), polyethylene glycol monooleate, and l-menthol were weighed so as to have the ratios shown in Table 1, and mixed at about 60° C. to obtain a homogeneous mixture. Separately, (B) each of the other components shown in Table 1 and purified water were weighed so as to have the ratios shown in the same table, and mixed at about 60° C. to obtain a uniform kneaded product. Next, (A) was added to (B) and mixed until uniform to obtain an adhesive agent composition having the composition shown in Table 1. Subsequently, the obtained adhesive agent composition was spread on the surface of a liner layer (release-treated polyester film) so as to have the mass (mass per unit area) shown in Table 1 to form an adhesive agent layer. Then, a backing layer (polyester sheet) was attached on the surface of the adhesive agent layer and cut into a predetermined size (5 cm×11 cm) to obtain a cooling sheet. Table 1 shows the results of the tests (1) to (5) described above with respect to the obtained cooling sheets.

Comparative Examples 1 to 4

Cooling sheets were obtained in the same manner as in Example 1 except that the compositions of the adhesive agent compositions were the compositions shown in Table 1. Table 1 shows the results of the tests (1) to (5) described above with respect to the obtained cooling sheets.

TABLE 1

|  | Example 1 | Comparative Example 1 | Comparative Example 2 | Comparative Example 3 | Comparative Example 4 |
| --- | --- | --- | --- | --- | --- |
| Polyethylene Glycol Monooleate (6EO) [Mass %] | 0.30 (3.0)*[1] | — | — | — | — |
| Sorbitan Monooleate [Mass %] | — | 0.30 (3.0)*[1] | — | — | — |
| Polyethylene Glycol Monostearate [Mass %] | — | — | 0.30 (3.0)*[1] | — | — |
| Polyoxyethylene Behenyl Ether [Mass %] | — | — | — | 0.30 (3.0)*[1] | — |
| Polyoxyethylene Sorbitan Monooleate (20EO) [Mass %] | — | — | — | — | 0.30 (3.0)*[1] |
| Polyvinyl Alcohol [Mass %] | 4.00 (2.08)*[2] | 4.00 (2.08)*[2] | 4.00 (2.08)*[2] | 4.00 (2.08)*[2] | 4.00 (2.08)*[2] |
| Polyacrylic Acid [Mass %] | 1.92 | 1.92 | 1.92 | 1.92 | 1.92 |
| Sodium Polyacrylate [Mass %] | 4.58 | 4.58 | 4.58 | 4.58 | 4.58 |
| Parahydroxybenzoate [Mass %] | 0.10 | 0.10 | 0.10 | 0.10 | 0.10 |
| l-Menthol [Mass %] | 0.08 | 0.08 | 0.08 | 0.08 | 0.08 |
| Concentrated Glycerin [Mass %] | 15.00 | 15.00 | 15.00 | 15.00 | 15.00 |
| Purified Water [Mass %] | 72.38 | 72.38 | 72.38 | 72.38 | 72.38 |
| Other Components [Mass %] | 1.64 | 1.64 | 1.64 | 1.64 | 1.64 |
| Total [Mass %] |  |  | 100.00 |  |  |
| Mass of Adhesive Agent Layer [g/m$^2$] | 1900 | 1900 | 1900 | 1900 | 1900 |
| (1-1) Solubility of Parahydroxybenzoate | 0 | 1 | 1 | 1 | 0 |
| (1-2) Antiseptic Property | 0 | 1 | 1 | 1 | 0 |
| (2) Liner Displacement | 1 | 0 | 2 | 2 | 2 |
| (3) Seepage | 0 | 0 | 0 | 1 | 1 |
| (4) Adhesion Strength (Adherence) | 1 | 1 | — | — | 2 |
| (5) Uneven Spread | 0 | 1 | 1 | 1 | 0 |

*[1]Ratio of surfactant content to parahydroxybenzoate content [mass ratio]
*[2]Ratio of polyvinyl alcohol content to polyacrylic acid content [mass ratio]

As is clear from the results shown in Table 1, in the cooling sheet of the present invention (Example 1) provided with an adhesive agent layer having a specific composition according to the present invention using polyalkylene glycol monooleate as a surfactant, it became possible to completely dissolve a parahydroxybenzoate in an adhesive agent layer with high water content even when the water content was increased to 65% by mass or more, and the growth of bacteria and mold in the adhesive agent layer was sufficiently prevented over a long period of time. At the same time, even when the mass of the adhesive agent layer was increased to 1500 g/m² or more, it was confirmed that a cooling sheet with sufficiently high adhesion strength and without uneven spread while sufficiently suppressing the occurrence of liner displacement and seepage was obtained. On the other hand, such effects were not sufficiently obtained in the cooling sheets (Comparative Examples 1 to 4) provided with an adhesive agent layer using a surfactant other than polyalkylene glycol monooleate.

Examples 2 to 11 and Comparative Examples 5 to 12

Cooling sheets were obtained in the same manner as in Example 1 except that the compositions of the adhesive agent compositions were the compositions shown in Tables 2 to 6. Tables 2 to 6 show the results of the tests (1) to (5) described above with respect to the obtained cooling sheets together with the results of Example 1. In Comparative Example 5, the tests (2) to (4) were not performed because part of the parahydroxybenzoate was not dissolved and the solid content remained.

TABLE 2

|  | Comparative Example 5 | Example 2 | Example 1 | Example 3 | Comparative Example 6 |
|---|---|---|---|---|---|
| Polyethylene Glycol Monooleate (6EO) [Mass %] | 0.10 (1.0)*¹ | 0.15 (1.5)*¹ | 0.30 (3.0)*¹ | 0.50 (5.0)*¹ | 1.00 (10.0)*¹ |
| Polyvinyl Alcohol [Mass %] | 4.00 (2.08)*² | 4.00 (2.08)*² | 4.00 (2.08)*² | 4.00 (2.08)*² | 4.00 (2.08)*² |
| Polyacrylic Acid [Mass %] | 1.92 | 1.92 | 1.92 | 1.92 | 1.92 |
| Sodium Polyacrylate [Mass %] | 4.58 | 4.58 | 4.58 | 4.58 | 4.58 |
| Parahydroxybenzoate [Mass %] | 0.10 | 0.10 | 0.10 | 0.10 | 0.10 |
| l-Menthol [Mass %] | 0.08 | 0.08 | 0.08 | 0.08 | 0.08 |
| Concentrated Glycerin [Mass %] | 15.00 | 15.00 | 15.00 | 15.00 | 15.00 |
| Purified Water [Mass %] | 72.58 | 72.53 | 72.38 | 72.18 | 71.68 |
| Other Components [Mass %] | 1.64 | 1.64 | 1.64 | 1.64 | 1.64 |
| Total [Mass %] |  |  | 100.00 |  |  |
| Mass of Adhesive Agent Layer [g/m²] | 1900 | 1900 | 1900 | 1900 | 1900 |
| (1-1) Solubility of Parahydroxybenzoate | 1 | 0 | 0 | 0 | 0 |
| (1-2) Antiseptic Property | 1 | 0 | 0 | 0 | 0 |
| (2) Line Displacement | — | 0 | 1 | 1 | 2 |
| (3) Seepage | — | 0 | 0 | 0 | 1 |
| (4) Adhesion Strength (Adherence) | — | 1 | 1 | 1 | 0 |
| (5) Uneven Spread | 1 | 0 | 0 | 0 | 0 |

*¹Ratio of surfactant content to parahydroxybenzoate content [mass ratio]
*²Ratio of polyvinyl alcohol content to polyacrylic acid content [mass ratio]

TABLE 3

|  | Comparative Example 7 | Comparative Example 8 | Example 1 | Example 4 | Example 5 |
|---|---|---|---|---|---|
| Polyethylene Glycol Monooleate (6EO) [Mass %] | 0.30 (3.0)*¹ | 0.30 (3.0)*¹ | 0.30 (3.0)*¹ | 0.30 (3.0)*¹ | 0.30 (3.0)*¹ |
| Polyvinyl Alcohol [Mass %] | 1.00 (0.52)*² | 2.00 (1.04)*² | 4.00 (2.08)*² | 5.00 (2.60)*² | 6.00 (313)*² |
| Polyacrylic Acid [Mass %] | 1.92 | 1.92 | 1.92 | 1.92 | 1.92 |
| Sodium Polyacrylate [Mass %] | 4.58 | 4.58 | 4.58 | 4.58 | 4.58 |
| Parahydroxybenzoate [Mass %] | 0.10 | 0.10 | 0.10 | 0.10 | 0.10 |
| l-Menthol [Mass %] | 0.08 | 0.08 | 0.08 | 0.08 | 0.08 |
| Concentrated Glycerin [Mass %] | 15.00 | 15.00 | 15.00 | 15.00 | 15.00 |
| Purified Water [Mass %] | 75.38 | 74.38 | 72.38 | 71.38 | 70.38 |
| Other Components [Mass %] | 1.64 | 1.64 | 1.64 | 1.64 | 1.64 |
| Total [Mass %] |  |  | 100.00 |  |  |
| Mass of Adhesive Agent Layer [g/m²] | 1900 | 1900 | 1900 | 1900 | 1900 |
| (1-1) Solubility of Parahydroxybenzoate | 0 | 0 | 0 | 0 | 0 |
| (1-2) Antiseptic Property | 0 | 0 | 0 | 0 | 0 |
| (2) Liner Displacement | 2 | 1 | 1 | 1 | 1 |
| (3) Seepage | 1 | 1 | 0 | 0 | 0 |
| (4) Adhesion Strength (Adherence) | 1 | 1 | 1 | 1 | 1 |
| (5) Uneven Spread | 0 | 0 | 0 | 0 | 0 |

*¹Ratio of surfactant content to parahydroxybenzoate content [mass ratio]
*²Ratio of polyvinyl alcohol content to polyacrylic acid content [mass ratio]

TABLE 4

|  | Comparative Example 9 | Example 6 | Example 1 | Example 7 | Comparative Example 10 |
|---|---|---|---|---|---|
| Polyethylene Glycol Monooleate (6EO) [Mass %] | 0.30 (3.0)*1 | 0.30 (3.0)*1 | 0.30 (3.0)*1 | 0.30 (3.0)*1 | 0.30 (3.0)*1 |
| Polyvinyl Alcohol [Mass %] | 4.00 (40.0)*2 | 4.00 (4.00)*2 | 4.00 (2.08)*2 | 4.00 (1.33)*2 | 4.00 (1.00)*2 |
| Polyacrylic Acid [Mass %] | 0.10 | 1.00 | 1.92 | 3.00 | 4.00 |
| Sodium Polyacrylate [Mass %] | 4.58 | 4.58 | 4.58 | 4.58 | 4.58 |
| Parahydroxybenzoate [Mass %] | 0.10 | 0.10 | 0.10 | 0.10 | 0.10 |
| I-Menthol [Mass %] | 0.08 | 0.08 | 0.08 | 0.08 | 0.08 |
| Concentrated Glycerin [Mass %] | 15.00 | 15.00 | 15.00 | 15.00 | 15.00 |
| Purified Water [Mass %] | 74.20 | 73.30 | 72.38 | 71.30 | 70.30 |
| Other Components [Mass %] | 1.64 | 1.64 | 1.64 | 1.64 | 1.64 |
| Total [Mass %] | 100.00 | | | | |
| Mass of Adhesive Agent Layer [g/m²] | 1900 | 1900 | 1900 | 1900 | 1900 |
| (1-1) Solubility of Parahydroxybenzoate | 0 | 0 | 0 | 0 | 0 |
| (1-2) Antiseptic Property | 0 | 0 | 0 | 0 | 0 |
| (2) Liner Displacement | 2 | 1 | 1 | 1 | 1 |
| (3) Seepage | 0 | 0 | 0 | 0 | 2 |
| (4) Adhesion Strength (Adherence) | 4 | 1 | 1 | 0 | 0 |
| (5) Uneven Spread | 1 | 0 | 0 | 0 | 0 |

*1 Ratio of surfactant content to parahydroxybenzoate content [mass ratio]
*2 Ratio of polyvinyl alcohol content to polyacrylic acid content [mass ratio]

TABLE 5

|  | Comparative Example 11 | Comparative Example 12 | Example 1 | Example 8 | Example 9 |
|---|---|---|---|---|---|
| Polyethylene Glycol Monooleate (6EO) [Mass %] | 0.30 (3.0)*1 | 0.30 (3.0)*1 | 0.30 (3.0)*1 | 0.30 (3.0)*1 | 0.30 (3.0)*1 |
| Polyvinyl Alcohol [Mass %] | 1.00 (10.0)*2 | 2.00 (2.00)*2 | 4.00 (2.08)*2 | 5.00 (1.70)*2 | 6.00 (1.50)*2 |
| Polyacrylic Acid [Mass %] | 0.10 | 1.00 | 1.92 | 3.00 | 4.00 |
| Sodium Polyacrylate [Mass %] | 4.58 | 4.58 | 4.58 | 4.58 | 4.58 |
| Parahydroxybenzoate [Mass %] | 0.10 | 0.10 | 0.10 | 0.10 | 0.10 |
| I-Menthol [Mass %] | 0.08 | 0.08 | 0.08 | 0.08 | 0.08 |
| Concentrated Glycerin [Mass %] | 15.00 | 15.00 | 15.00 | 15.00 | 15.00 |
| Purified Water [Mass %] | 77.20 | 75.30 | 72.38 | 70.30 | 68.30 |
| Other Components [Mass %] | 1.64 | 1.64 | 1.64 | 1.64 | 1.64 |
| Total [Mass %] | 100.00 | | | | |
| Mass of Adhesive Agent Layer [g/m²] | 1900 | 1900 | 1900 | 1900 | 1900 |
| (1-1) Solubility of Parahydroxybenzoate | 0 | 0 | 0 | 0 | 0 |
| (1-2) Antiseptic Property | 0 | 0 | 0 | 0 | 0 |
| (2) Liner Displacement | 3 | 1 | 1 | 1 | 0 |
| (3) Seepage | 0 | 2 | 0 | 0 | 0 |
| (4) Adhesion Strength (Adherence) | 4 | 1 | 1 | 0 | 0 |
| (5) Uneven Spread | 1 | 0 | 0 | 0 | 0 |

*1 Ratio of surfactant content to parahydroxybenzoate content [mass ratio]
*2 Ratio of polyvinyl alcohol content to polyacrylic acid content [mass ratio]

TABLE 6

|  | Example 10 | Example 1 | Example 11 |
|---|---|---|---|
| Polyethylene Glycol Monooleate (6EO) [Mass %] | 0.30 (3.0)*1 | 0.30 (3.0)*1 | 0.30 (3.0)*1 |
| Polyvinyl Alcohol [Mass %] | 4.00 (2.08)*2 | 4.00 (2.08)*2 | 4.00 (2.08)*2 |
| Polyacrylic Acid [Mass %] | 1.92 | 1.92 | 1.92 |
| Sodium Polyacrylate [Mass %] | 3.50 | 4.58 | 7.00 |
| Parahydroxybenzoate [Mass %] | 0.10 | 0.10 | 0.10 |
| I-Menthol [Mass %] | 0.08 | 0.08 | 0.08 |
| Concentrated Glycerin [Mass %] | 15.00 | 15.00 | 15.00 |
| Purified Water [Mass %] | 73.46 | 72.38 | 69.96 |
| Other Components [Mass %] | 1.64 | 1.64 | 1.64 |
| Total [Mass %] | 100.00 | | |

TABLE 6-continued

|  | Example 10 | Example 1 | Example 11 |
|---|---|---|---|
| Mass of Adhesive Agent Layer [g/m$^2$] | 1900 | 1900 | 1900 |
| (1-1) Solubility of Parahydroxybenzoate | 0 | 0 | 0 |
| (1-2) Antiseptic Property | 0 | 0 | 0 |
| (2) Liner Displacement | 1 | 1 |  |
| (3) Seepage | 0 | 0 | 0 |
| (4) Adhesion Strength (Adherence) | 0 | 1 | 1 |
| (5) Uneven Spread | 0 | 0 | 0 |

*[1]Ratio of surfactant content to parahydroxybenzoate content [mass ratio]
*[2]Ratio of polyvinyl alcohol content to polyacrylic acid content [mass ratio]

occurrence of liner displacement and seepage was obtained. On the other hand, such effects were not sufficiently obtained in the cooling sheet (Comparative Examples 5 to 12) provided with an adhesive agent layer whose composition was outside the scope of the specific composition according to the present invention.

Comparative Examples 13 to 16

Cooling sheets were obtained in the same manner as in Example 1 except that gelatin (Comparative Example 13) or xanthan gum (Comparative Example 14) was used instead of polyvinyl alcohol. Further, cooling sheets were obtained in the same manner as in Example 1 except that gelatin (Comparative Example 15) or xanthan gum (Comparative Example 16) was used instead of polyacrylic acid. Table 7 shows the results of the tests (1) to (5) described above with respect to the obtained cooling sheets.

TABLE 7

|  | Comparative Example 13 | Comparative Example 14 | Comparative Example 15 | Comparative Example 16 |
|---|---|---|---|---|
| Polyethylene Glycol Monooleate (6EO) [Mass %] | 0.30 (3.0)*[1] | 0.30 (3.0)*[1] | 0.30 (3.0)*[1] | 0.30 (3.0)*[1] |
| Polyvinyl Alcohol [Mass %] | — | — | 4.00 (2.08)*[2] | 4.00 (2.08)*[2] |
| Polyacrylic Acid [Mass %] | 1.92 | 1.92 | — | — |
| Sodium Polyacrylate [Mass %] | 4.58 | 4.58 | 4.58 | 4.58 |
| Gelatin [Mass %] | 4.00 | — | 1.92 | — |
| Xanthan Gum [Mass %] | — | 4.00 | — | 1.92 |
| Parahydroxybenzoate [Mass %] | 0.10 | 0.10 | 0.10 | 0.10 |
| I-Menthol [Mass %] | 0.08 | 0.08 | 0.08 | 0.08 |
| Concentrated Glycerin [Mass %] | 15.00 | 15.00 | 15.00 | 15.00 |
| Purified Water [Mass %] | 72.38 | 72.38 | 72.38 | 72.38 |
| Other Components [Mass %] | 1.64 | 1.64 | 1.64 | 1.64 |
| Total [Mass %] | 100.00 | | | |
| Mass of Adhesive Agent Layer [g/m$^2$] | 1900 | 1900 | 1900 | 1900 |
| (1-1) Solubility of Parahydroxybenzoate | 0 | 0 | 0 | 0 |
| (1-2) Antiseptic Property | 0 | 0 | 0 | 0 |
| (2) Liner Displacement | 3 | 3 | 0 | 2 |
| (3) Seepage | 0 | 0 | 0 | 0 |
| (4) Adhesion Strength (Adherence) | 4 | 4 | 4 | 3 |
| (5) Uneven Spread | 1 | 1 | 1 | 1 |

*[1]Ratio of surfactant content to parahydroxybenzoate content [mass ratio]
*[2]Ratio of polyvinyl alcohol content to polyacrylic acid content [mass ratio]

As is clear from the results shown in Tables 2 to 6, in the cooling sheet of the present invention (Examples 2 to 11) provided with an adhesive agent layer having a specific composition according to the present invention, it became possible to completely dissolve a parahydroxybenzoate in an adhesive agent layer with high water content even when the water content was increased to 65% by mass or more, and the growth of bacteria and mold in the adhesive agent layer was sufficiently prevented over a long period of time. At the same time, even when the mass of the adhesive agent layer was increased to 1500 g/m$^2$ or more, it was confirmed that a cooling sheet with sufficiently high adhesion strength and without uneven spread while sufficiently suppressing the As is clear from the results shown in Table 7, when gelatin (Comparative Example 13) or xanthan gum (Comparative Example 14) was used instead of polyvinyl alcohol as the water-soluble polymer, it was confirmed that unevenness occurred when the adhesive agent composition was spread, sufficient adhesion strength was not obtained in the obtained cooling sheet, and liner displacement was likely to occur. Also, when gelatin (Comparative Example 15) or xanthan gum (Comparative Example 16) was used instead of polyacrylic acid as the water-soluble polymer, it was confirmed that unevenness occurred when the adhesive agent composition was spread, sufficient adhesion strength was not obtained in the obtained cooling sheet, and liner displacement was likely to occur (especially when xanthan gum was used).

Examples 12 to 16

Cooling sheets were obtained in the same manner as in Example 1 except that the masses of the adhesive agent layers (mass per unit area) were set to the masses shown in Table 8. Table 8 shows the results of the tests (1) to (6) described above with respect to the obtained cooling sheets.

TABLE 8

|  | Example 12 | Example 13 | Example 14 | Example 15 | Example 16 |
|---|---|---|---|---|---|
| Polyethylene Glycol Monooleate (6EO) [Mass %] | 0.30 (3.0)*1 | 0.30 (3.0)*1 | 0.30 (3.0)*1 | 0.30 (3.0)*1 | 0.30 (3.0)*1 |
| Polyvinyl Alcohol [Mass %] | 4.00 (2.08)*2 | 4.00 (2.08)*2 | 4.00 (2.08)*2 | 4.00 (2.08)*2 | 4.00 (2.08)*2 |
| Polyacrylic Acid [Mass %] | 1.92 | 1.92 | 1.92 | 1.92 | 1.92 |
| Sodium Polyacrylate [Mass %] | 4.58 | 4.58 | 4.58 | 4.58 | 4.58 |
| Parahydroxybenzoate [Mass %] | 0.10 | 0.10 | 0.10 | 0.10 | 0.10 |
| I-Menthol [Mass %] | 0.08 | 0.08 | 0.08 | 0.08 | 0.08 |
| Concentrated Glycerin [Mass %] | 15.00 | 15.00 | 15.00 | 15.00 | 15.00 |
| Purified Water [Mass %] | 72.38 | 72.38 | 72.38 | 72.38 | 72.38 |
| Other Components [Mass %] | 1.64 | 1.64 | 1.64 | 1.64 | 1.64 |
| Total [Mass %] |  |  | 100.00 |  |  |
| Mass of Adhesive Agent Layer [g/m$^2$] | 1000 | 1500 | 2000 | 2500 | 3000 |
| (1-1) Solubility of Parahydroxybenzoate | 0 | 0 | 0 | 0 | 0 |
| (1-2) Antiseptic Property | 0 | 0 | 0 | 0 | 0 |
| (2) Liner Displacement | 1 | 1 | 1 | 2 | 2 |
| (3) Seepage | 0 | 0 | 0 | 0 | 1 |
| (4) Adhesion Strength (Adherence) | 2 | 1 | 1 | 0 | 0 |
| (5) Uneven Spread | 0 | 0 | 0 | 0 | 0 |
| (6) Cooling Performance | 2 | 1 | 1 | 0 | 0 |

*1Ratio of surfactant content to parahydroxybenzoate content [mass ratio]
*2Ratio of polyvinyl alcohol content to polyacrylic acid content [mass ratio]

As is clear from the results shown in Table 8, in the cooling sheet of the present invention provided with an adhesive agent layer having a specific composition according to the present invention, even when the mass of the adhesive layer having high water content was increased, the occurrence of liner displacement and seepage was sufficiently suppressed, the adhesion strength was sufficiently high, and the growth of bacteria and mold in the adhesive agent layer was sufficiently prevented over a long period of time. This made it possible to sufficiently improve the cooling performance by increasing the mass of the adhesive agent layer, and in particular, it was confirmed that extremely excellent cooling performance was exhibited by increasing the mass of the adhesive agent layer to 1500 g/m$^2$ or more (Examples 13 to 14). On the other hand, it was confirmed that when the mass of the adhesive agent layer was 2500 g/m$^2$ or more, even the cooling sheet of the present invention tended to cause liner displacement (Examples 15 to 16). In addition, it was confirmed that when the mass of the adhesive agent layer was 1000 g/m$^2$ or less, even the cooling sheet of the present invention tended to cause the cooling performance to decrease (Example 12).

INDUSTRIAL APPLICABILITY

As described above, the present invention makes it possible to provide a cooling sheet of the type which contains a water-soluble polymer, water, and the like in an adhesive agent layer that directly contacts an applied site, wherein even when the water content is increased and the mass of the adhesive agent layer is increased, the occurrence of liner displacement and seepage is sufficiently suppressed, the adhesion strength is sufficiently high, and the antiseptic is completely dissolved, so that the growth of bacteria and mold in the adhesive agent layer is sufficiently prevented over a long period of time.

The invention claimed is:

1. A cooling sheet comprising: a backing layer; an adhesive agent layer configured to directly contact an applied site; and a liner layer for protecting the adhesive agent layer, wherein the adhesive agent layer contains
    water at 65 to 85% by mass based on a total mass of the adhesive agent layer,
    polyalkylene glycol monooleate as a surfactant at 0.12 to 0.7% by mass based on the total mass of the adhesive agent layer,
    polyvinyl alcohol as a first water-soluble polymer at 3 to 10% by mass based on the total mass of the adhesive agent layer,
    polyacrylic acid as a second water-soluble polymer at 0.5 to 5% by mass based on the total mass of the adhesive agent layer,
    a neutralized polyacrylic acid as a third water-soluble polymer at 1 to 10% by mass based on the total mass of the adhesive agent layer, and
    a parahydroxybenzoate as an antiseptic at 0.01 to 1% by mass based on the total mass of the adhesive agent layer, and
    a mass ratio of a content of the polyvinyl alcohol to a content of the polyacrylic acid is in a range of 1.2:1 to 5:1, and a mass ratio of a content of the neutralized polyacrylic acid to a content of the polyacrylic acid is in a range of 1:1 to 5.5:1.

2. The cooling sheet according to claim 1, wherein a total content of the polyacrylic acid and the neutralized polyacrylic acid is 1.5 to 15% by mass based on the total mass of the adhesive agent layer.

3. The cooling sheet according to claim 1, wherein a mass ratio of the content of the polyvinyl alcohol to the total content of the polyacrylic acid and the neutralized polyacrylic acid is in a range of 0.33:1 to 1:1.

4. The cooling sheet according to claim 1, wherein in the adhesive agent layer, a mass ratio of a content of the polyalkylene glycol monooleate to a content of the parahydroxybenzoate is in a range of 1.2:1 to 7:1.

5. The cooling sheet according to claim 1, wherein the parahydroxybenzoate is a mixture of methyl parahydroxybenzoate and propyl parahydroxybenzoate.

6. The cooling sheet according to claim 1, wherein the polyalkylene glycol monooleate is polyethylene glycol monooleate.

7. The cooling sheet according to claim 1, wherein the adhesive agent layer has a mass of 1500 to 2300 g/m$^2$.

* * * * *